United States Patent
Xu et al.

(10) Patent No.: US 7,399,796 B2
(45) Date of Patent: Jul. 15, 2008

(54) PHASE CHANGE SUPPORT MATERIAL COMPOSITION

(75) Inventors: Pingyong Xu, Valencia, CA (US); Stephen A. Ruatta, South Pasadena, CA (US); Kris Alan Schmidt, Granada Hills, CA (US); Vu A. Doan, Glendale, CA (US)

(73) Assignee: 3D Systems, Inc., Rock Hill, SC (US)

( * ) Notice: Subject to any disclaimer, the term of this patent is extended or adjusted under 35 U.S.C. 154(b) by 680 days.

(21) Appl. No.: 10/870,610

(22) Filed: Jun. 17, 2004

(65) Prior Publication Data

US 2004/0242728 A1 Dec. 2, 2004

Related U.S. Application Data

(60) Division of application No. 10/186,447, filed on Jun. 28, 2002, now Pat. No. 7,176,253, and a continuation-in-part of application No. 09/971,247, filed on Oct. 3, 2001, now Pat. No. 6,841,589.

(51) Int. Cl.
*C09D 11/00* (2006.01)

(52) U.S. Cl. .............. 523/160; 523/161; 524/198; 524/270; 524/385; 524/487

(58) Field of Classification Search .............. 523/160, 523/161; 524/198, 270, 385, 487
See application file for complete search history.

(56) References Cited

U.S. PATENT DOCUMENTS

| | | | |
|---|---|---|---|
| 3,804,640 A | 4/1974 | Buckwalter | |
| 4,623,688 A | 11/1986 | Flanagan | |
| 4,751,102 A | 6/1988 | Adair et al. | |
| 4,772,530 A | 9/1988 | Gottschalk et al. | |
| 4,772,541 A | 9/1988 | Gottschalk et al. | |
| 5,001,354 A | 3/1991 | Gould et al. | |
| 5,031,120 A | 7/1991 | Pomerantz et al. | |
| 5,141,680 A | 8/1992 | Almquist et al. | |
| 5,453,121 A | 9/1995 | Nicholls et al. | |
| 5,574,084 A | 11/1996 | Peacock | |
| 5,740,051 A | 4/1998 | Sanders, Jr. et al. | |
| 5,936,027 A | 8/1999 | Zahrobsky et al. | |
| 5,958,169 A | 9/1999 | Titterington et al. | |
| 5,959,020 A | 9/1999 | Oliveri et al. | |
| 6,010,564 A | 1/2000 | Zhu et al. | |
| 6,132,665 A | 10/2000 | Bui et al. | |
| 6,193,923 B1 | 2/2001 | Leyden et al. | |
| 6,270,335 B2 | 8/2001 | Leyden et al. | |
| 6,306,769 B1 | 10/2001 | Thayer et al. | |
| 6,476,122 B1 | 11/2002 | Leyden | |
| 6,569,373 B2 | 5/2003 | Napadensky | |
| 6,644,763 B1 | 11/2003 | Gothait | |
| 6,658,314 B1 | 12/2003 | Gothait | |
| 6,660,209 B2 | 12/2003 | Leyden et al. | |
| 6,713,125 B1 | 3/2004 | Sherwood et al. | |
| 6,841,116 B2 | 1/2005 | Schmidt | |
| 2002/0171177 A1 | 11/2002 | Kritchman et al. | |

FOREIGN PATENT DOCUMENTS

| | | |
|---|---|---|
| EP | 0322257 A2 | 6/1989 |
| EP | 0 223 587 B1 | 2/1991 |
| EP | 0500225 A1 | 8/1992 |
| EP | 1033222 A1 | 9/2000 |
| JP | 6200204 A | 7/1994 |

OTHER PUBLICATIONS

"International Search Report" (European Patent Office) of foreign counterpart application, International Patent Application Serial No. PCT/US02/31475, dated Feb. 26, 2003, 4 pages.
"International Search Report" (European Patent Office) of foreign counterpart application, International Patent Application Serial No. PCT/US02/31476, dated Mar. 14, 2003, 3 pages.

*Primary Examiner*—Edward J. Cain
(74) *Attorney, Agent, or Firm*—William A. Simons

(57) ABSTRACT

A jettable non-curable support material composition useful for three-dimensional ink jet printing comprising at least one fatty alcohol and at least one abietic rosin ester alcohol, wherein the support material has a melting point between about 50° C. to about 65° C. and a freezing point between about 45° C. to about 55° C.

9 Claims, No Drawings

PHASE CHANGE SUPPORT MATERIAL COMPOSITION

This is a divisional of U.S. application Ser. No. 10/186,447, filed Jun. 28, 2002, now U.S. Pat. No. 7,176,253, and a continuation-in-part of U.S. application Ser. No. 09/971,247 filed Oct. 3, 2001, now U.S. Pat. No. 6,841,589, and assigned to the assignee of the present invention.

BACKGROUND OF THE INVENTION

1. Field of the Invention

The present invention relates to selected ultra-violet light (UV) curable hot melt (or phase change) compositions and non-curable support material that can be used in a solid object printer to produce strong and desirable three-dimensional parts from CAD designs. In particular, this invention relates to non-curable phase change support compositions which are comprised of at least one fatty alcohol and an abietic rosin ester tackifier.

2. Description of the Relevant Art

Commercially available hot melt printers such as the three-dimensional ThermoJet solid object printer available from 3D Systems of Valencia, Calif., use a phase change material or ink that is jetted through a print head as a liquid to form wax-like thermopolymer parts. These parts contain mixtures of various waxes and polymers and are solid at ambient temperatures, but convert to a liquid phase at elevated jetting temperatures. Accordingly, phase change materials used in such printers are required to have a melting point of at least 65° C. and a viscosity of about 13 cPs at about 130° C. to about 140° C. (jetting temperature). Suitable waxes useful in these jettable phase change materials have included paraffin, microcrystalline waxes, polyethylene waxes, ester waxes and fatty amide waxes. Suitable polymers useful for these phase change materials have included polyurethane resins, tall oil rosin and rosin ester polymers.

Existing phase change materials have some problems associated either with their physical characteristics (e.g. they are weak and brittle and subject to cracking after being jetted) or have processing limitations (e.g. they must be jetted at relatively high temperatures (130-140° C.)) because of the high viscosities of the individual components of such materials. Additionally there is a need for support material that is easily jetted, but is also easily and quickly removed from the three-dimensional part. Accordingly, there is a need for better materials that overcome these problems. The present invention is believed to solve these problems.

This patent application is related to U.S. application Ser. No. 09/924,608 filed Aug. 6, 2001, which is a continuation of prior U.S. application Ser. No. 09/252,512, filed Feb. 18, 1999, now U.S. Pat. No. 6,270,335, which is a divisional of U.S. application Ser. No. 08/722,335, filed Sep. 27, 1996, now abandoned, which is a continuation-in-part of U.S. application Ser. No. 08/534,813, filed Sep. 27, 1995, now abandoned. This application also relates to U.S. Pat. No. 6,193,923 (Ser. No. 09/252,512) which issued on Feb. 27, 2001 and is a divisional of Ser. No. 08/722,335. All of these related applications are incorporated by reference in their entirety herein.

BRIEF SUMMARY OF THE INVENTION

Therefore, one aspect of the present invention is directed to a non-curable support material composition useful for three-dimensional ink jet solid object fabrication in combination with a curable build material, the support material comprising at least one fatty alcohol and an abietic rosin ester tackifier, wherein the support material has a melting point higher than the uncured build material, but a lower melting point than the softening point of the cured build material.

Another aspect of the present invention is directed to a method for creating raised and special printing effects using ink jet technology comprising the steps of:
- depositing a UV light curable composition on the area selected for the special printing effects in an amount corresponding to the area selected and the height of the raised area relative to the medium on which it is deposited;
- depositing a non-curable support material on the area selected wherein the amount of support material to be deposited corresponds to the area selected for said printing effects and the geometry of the raised area formed by the UV light curable composition relative to the medium on which said composition is deposited;
- curing said area with UV light; and
- applying heat to melt away the support material.

Still another aspect of the present invention is directed to a selective deposition modeling method of forming at least a portion of a three-dimensional object on a layer-by-layer basis, comprising the steps of:
- a) generating computer data corresponding to layers of said object;
- b) providing a UV curable build material which is a fluid at at least one temperature between 40° C. and about 90° C.;
- c) providing a support material which is a fluid at at least one temperature between about 40° C. and about 90° C. comprising at least one fatty alcohol of the structure $C_nH_{2n+1}OH$ wherein n is an integer from about 12 to about 22 and an abietic rosin ester tackifier;
- d) elevating the temperature of the build material and the support material to a temperature above about 70° C. to about 90° C.;
- e) selectively dispensing the build material at the elevated temperature according to the computer data to form a layer of the object;
- f) selectively dispensing the support material at the elevated temperature according to the computer data to form a layer of support material contiguous to the build material;
- g) providing an environment that lowers the temperature of said dispensed build material and support material into a solid state;
- h) subjecting the dispensed build material to a UV light to cure the build material;
- i) repeating steps e), f), g) and h) to form subsequent layers until at least said portion of the object is formed; and
- j) applying heat to melt away the support material.

The non-curable support material of the present invention has the advantage of having a low-melting point that permits the support material to be removed from three-dimensional parts more easily by melting at lower temperatures.

DESCRIPTION OF THE PREFERRED EMBODIMENTS

The term "(meth)acrylate" is used herein to mean either or both methacrylate or acrylate.

The term "UV" or "ultra violet light" is used herein to mean any appropriate form of actinic radiation which is useful in curing the compositions of the present invention.

The UV curable urethane (meth)acrylate resins used herein can be any methacrylate or acrylate resin which polymerizes in the presence of a free radical photoinitiator, is thermally stable in an exposed state for at least one week at the jetting temperature (about 80° C.) and for at least 4 weeks in an enclosed state, and has a boiling point greater than the jetting temperature. It also preferably has a flash point above the jetting temperature, and preferably forms a tough, high modulus polymer when aggregated with other (meth)acrylate monomers and oligomers. It is also preferably curable under UV light at wavelengths from about 300 to about 400 nanometers. Alternatively, this component also may be curable in the visible light range (i.e. above about 400 nanometers) provided appropriate operator shielding is present.

These urethane (meth)acrylates used as the aforementioned component (i) are known to those skilled in the art and can be prepared in a known manner typically by reacting a hydroxyl-terminated polyurethane with acrylic acid or methacrylic acid to the corresponding urethane acrylate, or by reacting as isocyanate-terminated prepolymer with hydroxyalkyl acrylates or methacrylates to the urethane acrylate. Suitable processes are disclosed, inter alia, in EP-A 114 982 and EP-A 133 908. The molecular weight of such acrylates is generally in the range from 400 to 10,000, preferably from 500 to 7,000. Urethane acrylates are also commercially available by the SARTOMER Company under the product names CN980, CN981, CN975 and CN2901. The preferred amount of the urethane (meth)acrylate resin is from about 20% to about 40% by weight of the composition.

The waxes used herein are preferably urethane waxes and may be mono, di or higher functionality. Other waxes such as hydrocarbon waxes can instead be used. These include hydrogenated waxes, paraffin waxes, microcrystalline waxes, fatty ester waxes, and the like.

The urethane waxes used herein can either be inert urethane waxes or reactive urethane waxes that have one or more functional groups reactive with the aforementioned (meth)acrylate compounds (i), (iii) or (iv). One preferred class of inert linear urethane waxes has the chemical formula $C_{18}H_{37}NCOOC_nH_{(2n+1)}$ wherein n is an integer from 4 to 16. Another preferred class of reactive linear urethane waxes has the chemical formula $C_nH_{(2n+1)}NC(O)OC_mH_{(2m)}OC(O)C(CH_3)=CH_2$ wherein n is an integer from about 12 to about 18 and m is an integer from about 2 to about 12. Another preferred class of reactive urethane wax has the chemical formula $C_nH_{(2n+1)}O(O)CNC_2H_4OOCC(CH_3)=CH_2$ wherein n is an integer from about 4 to about 18. Preferably, the total amount of urethane wax in the UV curable composition is from about 5% to about 25% by weight. The most preferred urethane waxes are ADS038 [1-dodecyl-N-octadecyl carbamate: $CH_3(CH_2)_{17}NCOO(CH_2)_{11}CH_3$] and ADS043 [1-hexadecyl-N-octadecyl carbamate: $CH_3(CH_2)_{17}NCOO(CH_2)_{15}CH_3$] waxes available from American Dye Source, Inc. of Baie D'Urfe, Quebec, Canada. It is preferred that they be used in combination. Preferably, the freezing point of the urethane wax is greater than about 40° C. when in the UV curable composition. This facilitates planarization and layer height correction of the jetted materials.

The (meth)acrylate diluent used herein can be any (meth)acrylate having a low viscosity, typically less than about 13 cPs. However lower functionality materials are preferred, especially monofunctional (meth)acrylates, since these incur less polymerization shrinkage and therefore reduce printed object distortion. The diluent or diluents are added to the composition to mainly control viscosity, but also improve the other physical properties of the composition including improving adhesion of the cured composition to the build platform. The preferred amount of the (meth)acrylate diluent is from about 10% to about 60% by weight of the composition. For low molecular weight materials, methacrylates, dimethacrylates, triacrylates, and diacrylates can be used in a variety of combinations. These include tetrahydrofurfuryl methacrylate, triethylene glycol dimethacrylate, 2-phenoxyethyl methacrylate, lauryl methacrylate, ethoxylated trimethylolpropane triacrylate, polypropylene glycol monomethacrylate, polyethylene glycol monomethacrylate, cyclohexane dimethanol diacrylate, and tridecyl methacrylate.

Other compounds useful as the aforementioned component (iii) include the diacrylate and dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis(4-hydroxycyclohexyl)propane or bis(4-hydroxycyclohexyl)methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S.

Illustrative examples of tri(meth)acrylates which may be useful as component (iii) are: 1,1,1-trimethylolpropane triacrylate or methacrylate, ethoxylated or propoxylated 1,1,1-trimethylolpropanetriacrylate or methacrylate, ethoxylated or propoxylated glycerol triacrylate, pentaerythritol monohydroxy triacrylate or methacrylate; and also higher functional acrylates or methacrylates such as dipentaerythritol monohydroxy pentaacrylate or bis(trimethylolpropane) tetraacrylate. Such compounds are known to the skilled person and some are commercially available. Preferably these compounds useful as a diluent have a molecular weight in the range from 250 to 700.

Illustrative of the diluents potentially useful in the novel compositions of the present invention may also be selected from the following compounds: allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate and n-dodecyl (meth)acrylate, 2-hydroxyethyl (meth)acrylate, 2- and 3-hydroxypropyl (meth)acrylate, 2-methoxyethyl(meth)acrylate, 2-ethoxyethyl (meth)acrylate and 2- or 3-ethoxypropyl (meth)acrylate, tetrahydrofurfuryl methacrylate, 2-(2-ethoxyethoxy)ethyl acrylate, cyclohexyl methacrylate, 2-phenoxyethyl acrylate, glycidyl acrylate and isodecyl acrylate. Such products are also known and some are commercially available, as from the Sartomer Company, Inc.

The photoinitiator used herein is preferably an alpha-cleavage type (unimolecular decomposition process) photoinitiator or a hydrogen abstraction photosensitizer-tertiary amine synergist, that absorbs light preferably between about 250 nm and about 400 nm, more preferably from about 300 nm to about 365 nm, to yield free radical(s). Examples of alpha cleavage photoinitiators are Irgacure 184 (CAS 947-19-3), Irgacure 369 (CAS 119313-12-1), and Irgacure 819 (CAS 162881-26-7). An example of a photosensitizer amine combination is Darocur BP (CAS 119-61-9) with diethylaminoethylmethacrylate. The preferred amount of photoinitiator is from about 0.1% to about 5% by weight of the composition. The chemical formula of these photoinitiators is shown below:

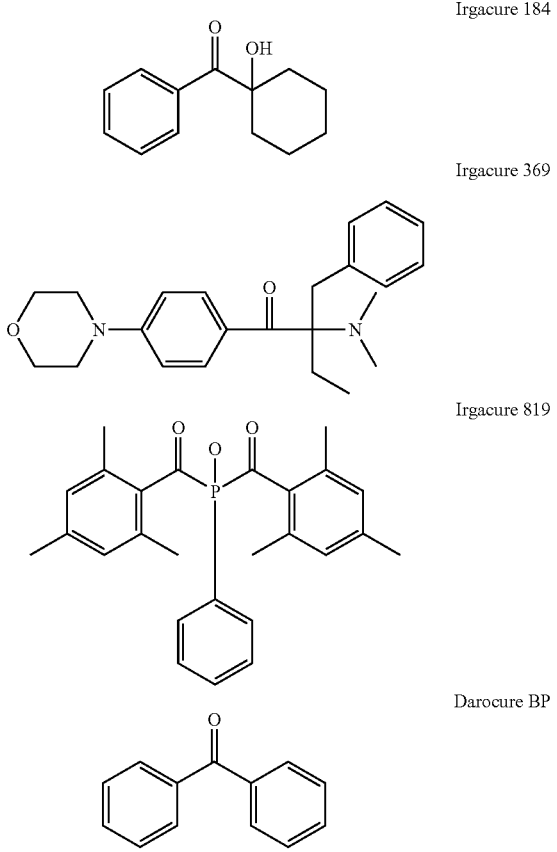

Irgacure 184

Irgacure 369

Irgacure 819

Darocure BP

It should be noted that any type of photoinitiator which, when irradiated suitably, forms free radicals can be employed as the aforementioned component (iv) in the novel compositions. The particular photoinitiator is selected based upon the type of actinic radiation employed to initiate the polymerization. Other typical known photoinitiators are benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1, 2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone, all of which are known compounds.

For example, suitable photoinitiators which are normally used in combination with a HeCd laser as radiation source are acetophenones, conveniently 2,2-dialkoxybenzophenones and 1-hydroxyphenyl ketones, for example 1-hydroxycyclohexyl phenyl ketone or 2-hydroxyisopropyl phenyl ketone (=2-hydroxy-2,2-dimethylacetophenone).

Another class of photoinitiators which are normally employed when irradiating with argon ion lasers are the benzil ketals, typically benzil dimethyl ketal. Preferably the photoinitiator is an α-hydroxyphenyl ketone, benzil dimethyl ketal or 2,4,6-trimethylbenzoyldiphenylphosphine oxide or a mixture of these initiators.

Another class of suitable photoinitiators comprises the ionic dye-counter ion compounds which are capable of absorbing actinic radiation and generating free radicals which are able to initiate the polymerization of the (meth)acrylates. Novel compositions containing ionic dye-counter ion compounds can be cured more variably in this way with visible light within the adjustable wavelength range of about 400 nm to about 700 nm. Ionic dye-counter ion compounds and their mode of action are known, for example from EP-A-0 223 587 and U.S. Pat. Nos. 4,751,102; 4,772,530 and 4,772,541.

The polymerization inhibitor used herein is preferably methoxyhydroquinone (MEHQ). This component is added to give additional thermal stability to the composition. The preferred amount of polymerization inhibitor is from about 0.1% to about 1% by weight of the composition. The polymerization inhibitor preferably is incorporated into the commercially provided reactive ingredients.

Optional components to the UV curable composition may include UV stabilizers, slip agents, wetting agents, flow control agents, sensitizers, antiprecipitants, surfactants, dyes, pigments or fillers. One preferred optional ingredient is an aliphatic/aromatic epoxy acrylate blend, such as Ebecryl 3200, or bis-phenol-A-di(meth)acrylate. It aids in the adhesion of the composition to the build platform, helps to reduce shrinkage and increases the flexural modulus of the cured material. It is preferably used in amounts from about 1% to about 20% by weight of the composition.

The preferred method of making the composition is to place all of the ingredients into a reaction vessel and then heating the mixture to about 75° C. to about 95° C. with stirring. The heating and stirring are continued until the mixture attains a homogenized molten state. The molten mixture is preferably filtered while in a flowable state to remove any large undesirable particles that may interfere with later jetting. The filtered mixture is then cooled to ambient temperatures until it is heated in the ink jet printer.

The solid photo-cured compositions of the present invention preferably possess the following physical characteristics:
1. Tensile Strength of at least 2,000 psia;
2. Tensile Modulus of at least 100,000 psia;
3. Tensile elongation of at least 9%;
4. Hardness of at least 60 shore D;
5. Impact Strength of at least 0.2 ft-lb/in (Izod notched);
6. Flexural Strength of at least 1,500 psia; and
7. Flexural Modulus of at least 2,500 psia.

The liquid photo-curable compositions of the present invention preferably possess the following physical characteristics:
1. Melting point from about 45° C. to about 65° C. (MP must be less than the jetting temperature);
2. Freezing point from about 33° C. to about 60° C.;
3. Jetting viscosity of about 10 to about 16 cPs at 70° C.-95° C.; and
4. Thermally stable for at least 3 days at the jetting temperature.

The UV curable hot melt material may be used with piezoelectric ink jet print heads to build digital three-dimensional objects using a UV lamp to cure the jetted material.

In one embodiment of the present invention, a preselected amount of the UV curable composition of the present invention is jetted through the print head or plurality of print heads of a suitable ink jet printer to form a layer onto a build support platform in a build chamber. Each layer of material is deposited according to the preselected CAD parameters. A suitable print head to deposit the material is the piezoelectric Z850 print head available from Xerox Corporation's Office Products Business Unit in Wilsonville, Oreg.

The temperature of the build environment is controlled so that the jetted droplets solidify on contact with the receiving surface. After each layer is deposited, the deposited material is planarized and cured with UV radiation prior to the deposition of the next layer. Optionally several layers can be deposited before planarization and curing or multiple layers can be deposited and cured followed by one or more layers being deposited and then planarized without curing. Planarization corrects the thickness of one or more layers prior to curing the material by evening the dispensed material to remove excess material and create a uniformly smooth exposed or flat up-facing surface on the support platform of the printer. Preferably planarization is accomplished with a heated wiper device, such as a counter-rotating roller. The process is continued until a useful finished three-dimensional design is prepared.

It should be noted that the consistency of the jetted build material of the present invention prior to curing must be sufficient to retain its shape and not be subject to viscous drag or shear from the planarizer. This property is obtained by the solidification after jetting of the about 5% to about 25% by weight wax that permeates throughout the still liquid urethane (meth)acrylate resin(s) and (meth)acrylate diluent(s) to form a supporting mesh or matrix for the liquid components. While the exact mechanism is not fully understood, it is theorized that the solidified wax support matrix increases the apparent viscosity of the jetted build material and provides sufficient surface area to promote and facilitate the adhesion of the uncured liquid components thereto to permit the jetted material to retain its shape with a paste-like semi-solid consistency, resist the aforementioned viscous drag and shear stress during planarization, and not be so large a percent of the composition to adversely affect the desired physical properties of the cured build material.

The present invention is further described in detail by means of the following Examples and Comparisons. All parts and percentages are by weight and all temperatures are degrees Celsius unless explicitly stated otherwise.

EXAMPLES 1-5

Five UV curable phase change build material formulations were developed having a viscosity of between about 13 to about 14 centipoise (cPs) at a temperature of about 80° C. The material formulations were targeted to have a melting point of between about 50° C. to about 60° C., and a freeze point of between about 45° C. to about 55° C. It is desired that the melting point of the material be at least lower than the dispensing temperature, but generally not lower than about 50° C. A melting point of between about 50° C. and about 80° C. is acceptable, although preferably between about 50° C. and about 60° C. to assure the material remains in the flowable state in light of temperature variations that can occur in the print head. In the preferred embodiment, where a non-curable phase change support material is dispensed from the same print head as the curable phase change build material, the support material would have a similar melting point, freeze point, and viscosity at the dispensing temperature. Although not tested, the curable phase change build material formulations are believed to have a dispensing life of between about 3-5 weeks based on the data from the thermal aging tests for similar formulations. The formulations generally comprise between about 20% to about 40% by weight of high molecular weight reactive oligomers, between about 10% to about 60% by weight of low molecular weight reactive (meth)acrylates, between about 1% to about 6% by weight of a photoinitiator, and between about 5% to about 25% by weight wax. The reactive components of both high and low molecular weight materials comprise between about 75% to about 95% by weight of the composition. The combination of high and low molecular weight monomers and oligomers were accordingly adjusted so as to achieve the desired viscosity of between about 13 to about 14 centipoise for the formulation at a temperature of about 80° C. For the high molecular weight materials urethane acrylates were used alone or with epoxy acrylates. For the low molecular weight materials, methacrylates, dimethacrylates, triacrylates, and diacrylates were used in a variety of combinations. Non-reactive urethane waxes were used, although hydrocarbon waxes could also be used, such as carbon hydrogenated waxes, paraffin waxes, microcrystalline waxes, fatty ester waxes, and the like. However, the wax must be chosen such that it is relatively insoluble in the monomer formulation upon cooling in order to form a solid planarizable layer. MEHQ was present in small amounts (100 to 800 ppm) in each of the (meth)acrylate components when purchased from the supplier. The components of these five exemplary build material formulations are provided by weight percent in Table 1.

TABLE 1

| Mfg. ID No. | General Component Name | Ex. 1 | Ex. 2 | Ex. 3 | Ex. 4 | Ex. 5 |
|---|---|---|---|---|---|---|
| CN980 | Urethane Acrylate | 7.2% | | | 6.5% | 7.2% |
| CN981 | Urethane Acrylate | | | 26% | | |
| E3200 | Epoxy Acrylate | | | 14% | 6% | |
| CN975 | Hexafunctional Urethane Acrylate | | 7.2% | | | |
| CN2901 | Urethane Acrylate | 27.5% | 27% | | 18.7% | 27.5% |
| SR203 | Tetrahydrofurfuryl Methacrylate | | | | | 18% |
| SR205 | Triethylene glycol dimethacrylate | 33% | | 46.5% | 41.05% | 15% |
| SR340 | 2-phenoxyethyl methacrylate | | | | | 19% |
| SR313 | Lauryl methacrylate | | 18% | | | |
| SR454 | Ethoxylated₃ Trimethylolpropane Triacrylate | | 4.5% | | | |

TABLE 1-continued

| Mfg. ID No. | General Component Name | Ex. 1 | Ex. 2 | Ex. 3 | Ex. 4 | Ex. 5 |
|---|---|---|---|---|---|---|
| SR604 | Polypropylene glycol monomethacrylate | | | | 12% | |
| CD406 | Cyclohexane dimethanol diacrylate | | 30% | | | |
| SR493D | Tridecyl methacrylate | 19% | | | | |
| ADS038 | Urethane wax | 7% | 5.3% | 10% | 10% | 9.3% |
| ADS043 | Urethane wax | 4.3% | 6% | 1.5% | 2% | 2% |
| I-184 | Photo-initiator | 2% | 2% | 2% | 3.75% | 2% |
| TOTAL | | 100% | 100% | 100% | 100% | 100% |

The following components used in the five formulations listed in Table 1 are available from the Sartomer Company, Inc. of Exton, Pa. under the following designations: CN 980, CN 981, CN 975, CN2901, SR 203, SR 205, SR 340, SR 313, SR 454, CD 406, SR604, SR 493D. The following components used on the five formulations listed in Table I are available from American Dye Source, Inc. of Baie D'Urfe, Quebec, Canada: ADS 038, and ADS 043. The epoxy acrylate under the 10 designation E 3200 is available as Ebecryl 3200 from UCB Chemical, Inc. of Atlanta, Ga. The photoinitiator under the designation 1-184 listed is available from Ciba Specialty Chemicals, Inc. of New York, N.Y.

The formulations in Table 1 were made in accordance with the present invention by mixing the individual components in a kettle equipped with a mixing blade. A kettle was preheated to about 85° C. and the components placed into the kettle, the kettle closed and stirring was commenced. Stirring continued as the components eventually equalized to the temperature of the kettle. Stirring was then continued until a homogenized molten state was achieved. The viscosity was measured and adjusted as needed. It took approximately 2.5 hours to mix a 75 pound quantity of the formulations to a homogenized state. The formulations were then removed from the kettle and filtered through a 1 micron absolute filter while in the flowable state. The formulations were then cooled to ambient temperature at which they transitioned from the flowable to the non-flowable state.

In a preferred embodiment, Selective Deposition Modeling (SDM) apparatus dispenses a preferred UV curable phase change material, such as that in Example 4 of Table 1, to form the object and another non-UV curable phase change material to form supports for the object, as needed. This is desired so that the non-curable phase change material can be removed from the cured object by application of a solvent to dissolve the support material or by application of heat to melt the support material.

A preferred support material formulation comprises from about 60% to about 80% by weight, more preferably from about 65% to about 75% by weight, and most preferably about 70% by weight octadecanol available from Ruger Chemical of Irvington, N.J., and from about 20% to about 40% by weight, more preferably from about 25% to about 35% by weight, and most preferably about 30% by weight of an abietic rosin ester tackifier sold under the designation of KE 100 available from Arakawa Chemical of Chicago, Ill. Octadecanol is a long chained aliphatic alcohol, hereinafter referred to as a fatty alcohol. Other suitable fatty alcohols can be used, as well as combinations of fatty alcohols, of the structure $C_nH_{2n+1}OH$ wherein n is an integer from about 12 to about 22. These other fatty alcohols useful as support material, either alone or in combination, may include dodecanol ($C_{12}H_{25}OH$), tetradecanol ($C_{14}H_{29}OH$), hexadecanol ($C_{16}H_{33}OH$), eicosanol ($C_{20}H_{41}OH$), and docosanol ($C_{22}H_{45}OH$). Additionally decanol ($C_{10}H_{21}OH$) may be useful in combinations with other fatty alcohols.

The support material formulation has a viscosity of between about 10.0 to about 19.0 centipoise, more preferably between about 11.0 to about 14.0, and most preferably between about 11.3 to about 11.8 centipoise at a temperature of about 80° C., and a melting point of between about 50° C. to about 65° C., more preferably from about 55° C. to about 62° C., most preferably from about 60° C. to about 62° C., and a freezing point of from about 45° C. to about 55° C., more preferably from about 47° C. to about 52° C., and most preferably from about 49° C. to about 51° C.

The support material formulation was mixed in a kettle equipped with a mixing blade. The kettle is preheated to about 85° C. and the octadecanol is placed into the kettle by itself, as it has the lower melting point, and the kettle is closed and stirring commenced. Once the octadecanol has melted, the KE 100 is added to the mixture while stirring continues. The kettle is closed and stirring continues until a homogenized state of the mixture is achieved. The viscosity is measured and adjusted if needed. The formulation is then removed from the kettle and filtered through a 1 micron absolute filter while in the flowable state. The formulation is then cooled to ambient temperature wherein it transitions from the flowable to the non-flowable state.

An alternate support material can employ hexadecanol in place of the octadecanol in the same weight percent in combination with the KE-100 tackifier. Hexadecanol is also a long-chained aliphatic alcohol which will also be referred as a fatty alcohol which creates a support material that melts between about 50° C. to about 52° C. and has a freezing point of about 39° C. to about 42° C. Hexadecanol is available commercially from Ruger Chemical of Irvington, N.J. Hexadecanol, as with the other fatty alcohols, permits a support material to be formulated which has a lower melting point and hence a lower temperature to be employed to remove the jetted supports from the part.

In the preferred SDM apparatus of the present invention, the Z850 print head is configured to also dispense a non-curable phase change support material as well as the curable phase change build material. Sample parts were made in this manner and the support material removed to expose the three-dimensional objects.

The support material is removed by further processing. Generally, thermal processing by the application of heat to bring the support material back to a flowable state is needed to remove substantially all of the support material from the three-dimensional object. This can be accomplished in a variety of ways. For example, the part can be placed in an air heated chamber or in a heated vat of liquid material, such as water or oil or heated support material or a combination of both heated air and heated liquid material. Physical agitation may also be used, such as by directing a jet of the heated liquid material directly at the support material or moving the part with the attached support about in the heated vat of liquid material. This can also be accomplished by steam cleaning with appropriate equipment. Alternatively, the support material can also be removed by submersing the material in an appropriate liquid solvent to dissolve the support material.

After the support material was removed from the parts, the three-dimensional objects were then tested to determine the resulting physical properties achieved. The physical properties measured for the five formulations are provided in Table 2 along with their viscosity's, melting points and freezing points. Only the formulation in Example 4 was tested for mechanical impact strength properties after cure.

TABLE 2

| Property | Ex. 1 | Ex. 2 | Ex. 3 | Ex. 4 | Ex. 5 |
|---|---|---|---|---|---|
| Viscosity at 80° C. | 12.9 cPs | 12.9 cPs | 12.9 cPs | 12.8 cPs | 13.1 cPs |
| Melting point ° C. | 52° C. | 55° C. | 57° C. | 56° C. | 53° C. |
| Freezing point ° C. | 46° C. | 47.5° C. | 50° C. | 49.5° C. | 45° C. |
| Elongation % E (after cure) | 9% | 4% | 5% | 11% | 22.2% |
| Tensile Strength (psi) (after cure) | 2,340 psi | 2,383 psi | 5,597 psi | 2,800 psi | 2,771 psi |
| Tensile Modulus (psi) (after cure) | 92,000 psi | 116,000 psi | 267,000 psi | 108,500 psi | 129,000 psi |
| Impact strength(ft-lb/in) (Izod notched) | Not Measured | Not Measured | Not Measured | 0.24 | Not Measured |

The formulation of Example 4 was also measured or tested for the following properties:

| | |
|---|---|
| Viscosity at 90° C. | 10.2 cPs |
| Viscosity at 75° C. | 14.5 cPs |
| Viscosity at 70° C. | 16.7 cPs |
| Viscosity at 65° C. | 19.4 cPs |
| Melt/Freeze Temperature | 58° C./49.5° C. |
| Surface Tension @ 85° C. | 35 dyne/cm |
| Jetting Temperature Density | 0.99 grams/ml |
| Uncured Density @ room temperature | 1.01 grams/ml |

These mechanical properties (tensile strength and tensile modulus) are far superior to those properties obtained in SDM using thermoplastic phase change materials. For example, in U.S. Pat. No. 6,132,665 to Bui et al., the non-curable thermoplastic phase change formulation disclosed has an Elongation (% E) of 3 and a tensile stress of 435 psi (3 MPa). These physical properties are representative of those achieved using the ThermoJet® solid object printer dispensing ThermoJet 2000 build material, both apparatus and material sold by 3D Systems, Inc. of Valencia, Calif. The five curable phase change formulations clearly exhibit superior tensile strength (tensile strength is a good property related to toughness—impact strength would be a better measurement of improved properties, but the ThermoJet 2000 material's impact strength is too low to measure) compared to the non-curable thermoplastic formulations. For instance, the tensile strength of the formulation in Example 1 is over 5 times greater than the tensile strength of the non-curable thermoplastic formulation.

While the invention has been described above with reference to specific embodiments thereof, it is apparent that many changes, modifications, and variations can be made without departing from the inventive concept disclosed herein. For example, it should be noted that it is possible to tailor the physical properties of the final non-curable phase change support material by use of a combination of fatty alcohols, in conjunction with the abietic rosin ester. Accordingly, it is intended to embrace all such changes, modifications and variations that fall within the spirit and broad scope of the appended claims. All patent applications, patents and other publications cited herein are incorporated by reference in their entirety.

What is claimed:

1. A method for creating raised area and special printing effects using ink jet technology comprising the steps of:
    jetting a UV light curable composition on an area selected for the special printing effects in an amount corresponding to the area selected and a desired height for the raised area relative to a medium on which it is deposited;
    jetting a non-curable support material on the area selected wherein the amount of material to be deposited corresponds to the area selected for said printing effects and the height of the raised area relative to the medium on which said composition is deposited, wherein said non-curable support material that comprises from about 50% to about 80% by weight of a fatty alcohol or combinations of fatty alcohols of the structure $C_nH_{2n+1}OH$ wherein n is an integer from about 12 to about 22;
    curing the area selected with UV light; and
    removing the support material by applying heat to melt away the support material.

2. A method according to claim 1 wherein the non-curable support material has a viscosity at about 80° C. of from about 10.0 to about 19.0 centipoise.

3. A selective deposition modeling method of forming at least a portion of a three-dimensional object on a layer-by-layer basis comprising the steps of:
    a) generating computer data corresponding to layers of said object;
    b) providing a UV curable build material which is a fluid at at least one temperature between about 40° C. and about 90° C.;
    c) providing a non-curable support material which is a fluid at at least one temperature between about 40° C. and about 90° C. comprising at least one fatty alcohol of the structure $C_nH_{2n+1}OH$ wherein n is an integer from about 12 to about 22 and an abietic rosin ester;
    d) elevating the temperature of the build material and the support material to a temperature above 70° C. to about 90° C.;

e) selectively dispensing the build material at the elevated temperature according to the computer data to form a layer of the object;

f) selectively dispensing the support material at the elevated temperature according to the computer data to form a layer of support material contiguous to the build material;

g) providing an environment that lowers the temperature of the dispensed build material and the support material into a solid state;

h) subjecting the solid dispensed material to a UV light to cure the build material; and i) repeating steps e), f), g) and h) to form subsequent layers until at least the portion of the object is formed.

4. The method of claim 3 wherein step e) is accomplished by jetting the composition through at least one print head.

5. The method of claim 4 further comprising the non-curable support material comprising from about 60% to about 80% by weight of a fatty alcohol or combinations of fatty alcohols of the structure $C_nH_{2n+1}OH$ where n is an integer from about 10 to about 22 and the fatty alcohol comprises about 205 to about 405 by weight of the non-curable support material.

6. The method of claim 5 wherein the non-curable support material has a viscosity at about 80° C. about 10.0 to about 19.0 centipoise.

7. The method of claim 5 wherein the non-curable support material has a viscosity at about 80° C. of from about 11.0 to about 14.0 centipoise.

8. The method of claim 5 wherein the non-curable support material has a viscosity at about 80° C. of from about 11.3 to about 11.8 centipoise.

9. The method of claim 3 wherein step e) is accomplished by jetting the composition through at least one piezoelectric print head.

* * * * *